(12) United States Patent
Jin et al.

(10) Patent No.: US 12,382,934 B2
(45) Date of Patent: Aug. 12, 2025

(54) WELFARE-ORIENTED RAISING HOUSE FOR MEAT-TYPE DUCKS

(71) Applicant: Anhui Agricultural University, Hefei (CN)

(72) Inventors: Sihua Jin, Hefei (CN); Weifeng Gao, Hefei (CN); Zhaoyu Geng, Hefei (CN); Lijun Jiang, Hefei (CN); Chengcheng Cao, Hefei (CN); Bailing Xue, Hefei (CN); Zihui Zhu, Hefei (CN); Xuan Zhou, Hefei (CN); Ziting Pan, Hefei (CN)

(73) Assignee: Anhui Agricultural University, Hefei (CN)

( * ) Notice: Subject to any disclaimer, the term of this patent is extended or adjusted under 35 U.S.C. 154(b) by 188 days.

(21) Appl. No.: 18/237,522

(22) Filed: Aug. 24, 2023

(65) Prior Publication Data
US 2024/0065234 A1    Feb. 29, 2024

(30) Foreign Application Priority Data

Aug. 26, 2022   (CN) .......................... 202211032920.2

(51) Int. Cl.
| | |
|---|---|
| *A01K 31/00* | (2006.01) |
| *A01K 31/04* | (2006.01) |
| *A01K 31/22* | (2006.01) |

(52) U.S. Cl.
CPC .............. *A01K 31/04* (2013.01); *A01K 31/22* (2013.01)

(58) Field of Classification Search
None
See application file for complete search history.

(56) References Cited

U.S. PATENT DOCUMENTS

| | | | | |
|---|---|---|---|---|
| 2008/0178819 | A1* | 7/2008 | Sia | A01K 31/06 |
| 2021/0267174 | A1* | 9/2021 | Yu | A01K 31/18 |
| 2023/0309515 | A1* | 10/2023 | Lai | A01K 31/17 |
| 2024/0224948 | A1* | 7/2024 | Ying | A01K 31/00 |

\* cited by examiner

*Primary Examiner* — Joshua J Michener
*Assistant Examiner* — Henry Hooper Mudd
(74) *Attorney, Agent, or Firm* — Siritzky Law, PLLC

(57) ABSTRACT

A welfare-oriented raising house for meat-type ducks, including a raising house, is provided. The raising house is internally provided with a support frame which is of a U-shaped structure and arranged in a length direction of the raising house, a raising net arranged at a top of the support frame, a cleaning and storing mechanism arranged at one end of the support frame for cleaning and storing the raising net, a traction mechanism arranged at the other end of the support frame for the traction of the raising net, blocking mechanisms which are of a zigzag structure and arranged at both sides of the support frame, and tensioning vibration mechanisms arranged at bottoms of the blocking mechanisms and fixedly connected to a side edge of the support frame.

10 Claims, 5 Drawing Sheets

WELFARE-ORIENTED RAISING HOUSE FOR MEAT-TYPE DUCKS

CROSS-REFERENCE TO RELATED APPLICATION

This patent application claims the benefit and priority of Chinese Patent Application No. 202211032920.2 filed with the China National Intellectual Property Administration on Aug. 26, 2022, the disclosure of which is incorporated by reference herein in its entirety as part of the present application.

TECHNICAL FIELD

The present disclosure relates to the technical field of meat-type duck raising, in particular to a welfare-oriented raising house for meat-type ducks.

BACKGROUND

The floor of the traditional meat-type duck raising house is made of straw, rice hulls and other organic padding. However, due to the fact that the duck manure is inconvenient to remove timely, ammonia concentration in the duck house is easy to rise for a long time. In winter, the discharge ammonia gas from the duck house is easy to make it difficult to keep the duck house warm, which is easy to cause respiratory and intestinal diseases of ducks. With the continuous expansion of raising scale, the requirements for raising technology and facilities are increasing day by day, and the raising mode is changing from individual free range to large-scale and intensive raising. There are many shortcomings in the traditional floor rearing, free range and semi-free range modes, for example, the floor rearing mode has disadvantages of high duck manure discharge pollution, poor environmental sanitation condition, low utilization rate of meat-type duck feed, high incidence rate, high dosage, and large land area, and the floor rearing, free range and semi-free range modes are inconvenient for feeding management, seriously affecting the economic benefits of meat-type duck raising. Intensive farming will become the main mode of raising industry, mainly including net rearing, floor rearing, combination of drought and water, and other farming modes, but it is necessary to solve the impact of the manure discharge of the meat-type ducks on the surrounding environment and autoimmune epidemic prevention of the meat-type ducks.

A net rearing system applied to meat-type duck raising is recorded in the patent with application number 2013106724106. The net rearing system includes a support part, a net rearing part and a transmission part. The support part is used to support the net rearing part, and a manure receiving area is arranged below the net rearing part. In the meat-type duck raising process, the transmission part can be used to drive the net rearing part to rotate and transform duck house into a clean duck house. The duck manure is removed regularly and the duck house is cleaned on time. The net rearing system is convenient for feeding and management, can reduce the occurrence of epidemic diseases, improve the survival rate, reduce cost, improve production efficiency, reduce energy consumption and improve feed conversion rate. The appearance feathers of fatten ducks are clean, the occurrence of rotting hair in chest and abdomen and folliculitis on the appearance of red meat are completely eradicated, thus ensuring the quality and safety from raw materials to products, and recycling of high-purity feces.

Although the net can be rolled according to the present application, in the actual raising process, the laid raising net is easy to loosen and under-tensioned. During rolling, a large number of foreign matters left on the raising net are inconvenient to clean up, and the residual foreign matters will breed bacteria for a long time and lead to infection of meat-type ducks. Therefore, a welfare-oriented raising house for meat-type ducks is needed.

SUMMARY

In order to solve the technical problems that the laid raising net is under-tensioned, a large number of foreign matters left on the raising net are inconvenient to clean up, and the residual foreign matters will breed bacteria for a long time and lead to infection of meat-type ducks, a welfare-oriented raising house for meat-type ducks is provided.

The present disclosure is achieved by using the following technical solution. A welfare-oriented raising house for meat-type ducks includes raising house. The raising house is internally provided with a support frame which is of a U-shaped structure and arranged in a length direction of the raising house, a raising net arranged at a top of the support frame, a cleaning and storing mechanism arranged at one end of the support frame for cleaning and storing the raising net, a traction mechanism arranged at an other end of the support frame for a traction of the raising net, blocking mechanisms which are of a zigzag structure and arranged at both sides of the support frame, and tensioning vibration mechanisms arranged at bottoms of the blocking mechanisms and fixedly connected to a side edge of the support frame.

The cleaning and storing mechanism includes a box body arranged at an end of the support frame, two baffles fixedly connected into the box body and arranged in a length direction of the support frame, guide channels penetrating through each of the two baffles and equidistantly distributed along a length direction of the baffles, tensioning mechanisms on which each of the guide channels slidingly sleeves and connected to the box body, adjusting mechanisms arranged on an inner side wall of the box body and configured for driving the tensioning mechanisms to tension, a partition plate arranged between the two baffles, and a cleaning mechanism arranged on one side, close to the support frame, of the partition plate.

According to above technical solution, the raising net is stored and cleaned, and the raising net can be conveniently laid on the top of the support frame. In the laying process, a sectional positioning-pressing mode is adopted to ensure that the raising net is firmly tensioned.

As a further improvement of the above solution, the tensioning mechanisms each include a guide pipe fixedly connected to the inner side wall of the box body, a movable pipe on which the other end of the guide pipe slidingly sleeves and capable of moving in an axis direction of the guide pipe, and a driving shaft on which the other end of the movable pipe slidingly sleeves; a baffle of the two baffles adjacent to the driving shaft movably sleeves on one end, extending out of the movable pipe, of the driving shaft, and a push plate is fixedly connected to a periphery of the movable pipe; a first gear fixedly sleeves on a periphery of the driving shaft, a sleeve fixedly connected to the driving shaft is installed at one side, away from the movable pipe, of the first gear, and the sleeve is perpendicular to the driving shaft; one end, away from the driving shaft, of the sleeve sleeves outside a telescopic rod moving in a length direction of the sleeve, a mounting shaft perpendicular to the telescopic rod is fixedly connected to one end, extending out of the sleeve, of the telescopic rod, the guide channel slidingly sleeves on the mounting shaft, and a tensioning roller movably sleeves on a periphery of the mounting shaft.

Through the above technical solution, the raising net can be alternately tensioned for storage. The raising net is stored in such a way, thus facilitating subsequent operations for sterilizing and drying the raising net.

As a further improvement of the above solution, the adjusting mechanisms each include a lead screw connected to the two baffles through bearing housings, and a slider threadedly sleeving on a periphery of the lead screw; the slider is slidingly connected to the baffles; a squeezing plate of a strip structure is fixedly connected to one side, close to respective one of the tensioning mechanisms, of the slider, and both ends of the squeezing plate are formed with inclined slopes; and a rack moved to mesh with the respective tensioning mechanism is fixed to a top of the squeezing plate.

According to the technical solution, the adjusting mechanism is used to drive the tensioning mechanisms in sequence to conduct a deflection and tensioning operation in the advancing process, thereby alternately tensioning the raising net for storage.

As a further improvement of the above solution, the cleaning mechanism includes two first guide rollers arranged in a direction from the support frame to the partition plate and movably mounted with the box body; first cleaning rollers arranged at a bottom between the two first guide rollers and movably mounted with the box body; a push plate arranged at a top between the two first guide rollers; two pressing rollers connected to a bottom of the push plate through a support; second cleaning rollers fixedly connected to the push plate and connected above sides of the two pressing rollers through the support; first nozzles fixedly connected to the box body and installed between a first guide roller and a first cleaning roller which are close to the partition plate; and second nozzles fixedly connected to the push plate and installed at a top of a second cleaning roller adjacent to the partition plate through the support; and a first pushing unit fixedly connected to the box body and installed at the top of the push plate.

Through the above technical solution, inner and outer sides of the raising net are sufficiently. Meanwhile, the raising net is preliminarily dried to facilitate subsequent operations of drying and sterilizing.

As a further improvement of the above solution, the guide channels of one of the two baffles are located at an upper portion of the one baffle, the guide channels of other one of the two baffles are located at a lower portion of the other baffle, and guide channel supports on the two baffles are staggered up and down.

As a further improvement of the above solution, the support frame includes two fixing frames arranged inside the raising house, and a bottom plate fixedly connected to a top between the two fixing frames, wherein blanking holes penetrate through the bottom plate.

As a further improvement of the above solution, the raising net includes a net-shaped main body, bottom clamping plates arranged on both sides of the main body and arranged in sequence in a length direction of the main body, and top clamping plates for clamping the main body fixed to tops of the bottom clamping plates by screws.

Through the above technical solution, the intermittent clamping mode is adopted to install on the raising net, so that on the one hand, the installation is convenient; on the other hand, when the raising net moves, the bottom clamping plate and the ejector rod collide with each other intermittently, which makes the raising net shake to shake off the foreign matters on the raising net.

As a further improvement of the above solution, the tensioning vibration mechanisms each include guide plates arranged on both sides of the top of the support frame, a guide groove formed on a top of each one of the guide plates, and inserting holes provided on an inner side wall of a bottom of the guide groove and arranged in sequence in a length direction of the guide plate; each one of the inserting hole slidingly sleeves an ejector rod, one end, extending out of the bottom of the inserting hole, of the ejector rod is fixedly connected to a same support plate, and a second pushing unit fixedly connected to the support frame is installed at a bottom of the support plate.

Through the above technical solution, the ejector rod is used to provide shaking power when the raising net moves, thus positioning and tensioning the raising net in the pressing process.

As a further improvement of the above solution, he blocking mechanisms each include a blocking net located at the top of the support frame, a pressing plate fixed to a bottom of the blocking net, and a connecting frame fixed to a bottom of the pressing plate; and a third pushing unit fixedly connected to the support frame is installed at a bottom of the connecting frame.

As a further improvement of the above solution, the traction mechanism includes a transverse plate fixedly connected to the other end of the support frame, and a winding reel fixedly connected to the transverse plate and provided with an opening at a top; the winding reel movably sleeves a winding shaft, a pull rope fixedly connected to an end of the raising net is fixedly connected to a periphery of the winding shaft, and a first motor fixedly connected to the winding reel is installed at one end of the winding shaft.

Compared with the prior art, the present disclosure has the following beneficial effects:

1. In the process of laying the raising net, the raising net is tensioned by traction, and then the raising net is laid flatly on the support frame by sectional positioning and pressing, so as to prevent the raising net from being laid infirmly and loosely in the raising process.
2. In the process of cleaning and storing the raising net, the raising net is shaken firstly during the movement of the raising net, and most foreign matters adhered to the raising net are separated, thus facilitating subsequent cleaning operations.
3. In the process of cleaning and storing the raising net, the raising net is shaken firstly during the movement of the raising net, and most foreign matters adhered to the raising net are separated, thus facilitating subsequent cleaning operations.

1—raising house, 2—support frame, 3—blocking mechanism, 4—tensioning vibration mechanism, 5—cleaning and storing mechanism, 6—raising net, 7—traction mechanism, 21—guide pipe, 22—movable pipe, 23—push plate, 24—driving shaft, 25—first gear, 26—sleeve, 27—telescopic rod, 28—mounting shaft, 29—tensioning roller, 31—first guide roller, 32—first cleaning roller, 33—first nozzle, 34—push plate, 35—second cleaning roller, 36—pressing roller, 37—second nozzle, 41—guide plate, 42—guide groove, 43—inserting hole, 44—ejector rod, 45—support plate, 51—box body, 52—baffle, 53—guide channel, 54—tensioning mechanism, 55—adjusting mechanism, 56—partition plate, 57—cleaning mechanism, 61—main body, 62—top clamping plate, 63—bottom clamping plate.

DETAILED DESCRIPTION OF THE EMBODIMENTS

The present disclosure is further described below with reference to the accompanying drawings and specific embodiments. It should be noted that the following embodiments or technical features can be arbitrarily combined to form a new embodiment without conflict.

Embodiment I

Figure 1:
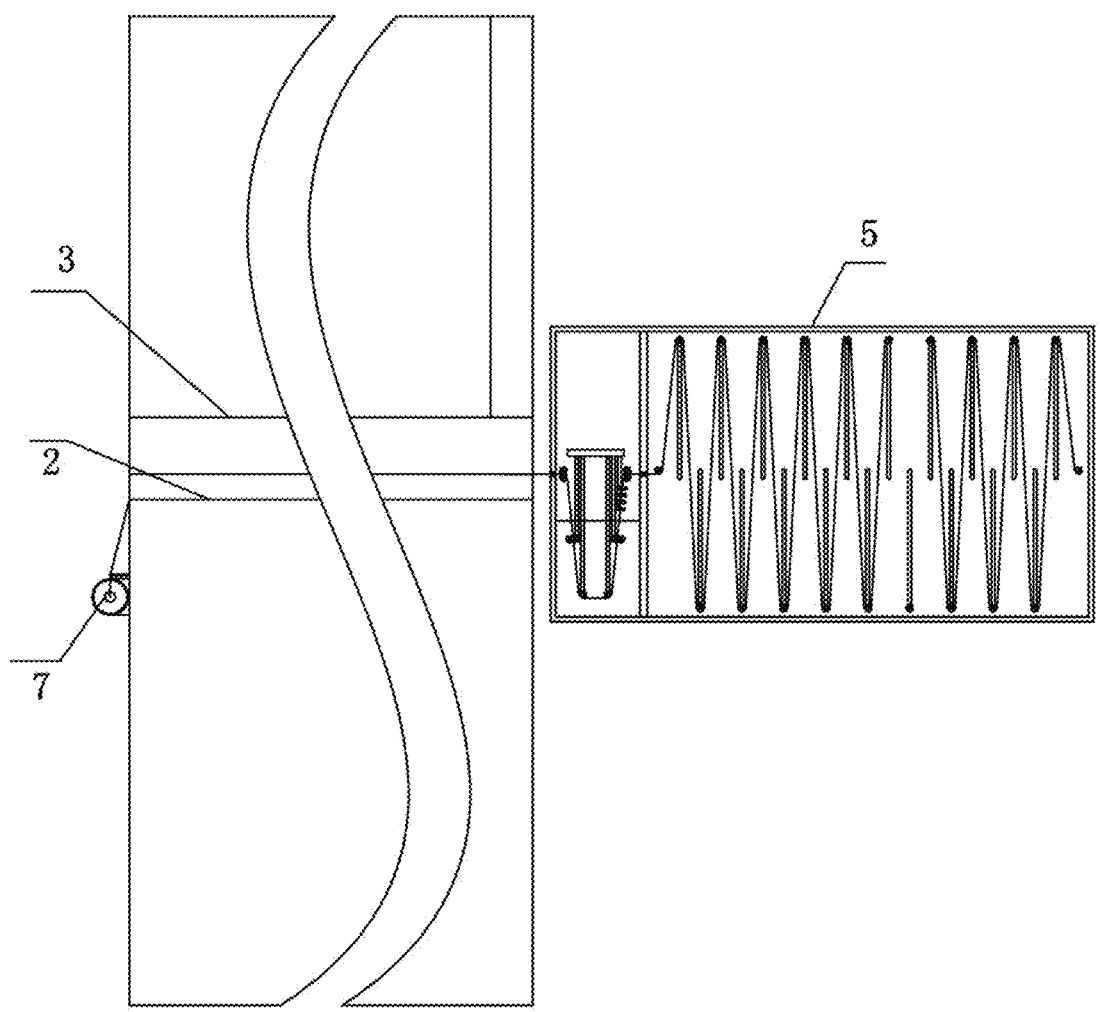
FIG. 1 is a structural schematic diagram of a welfare-oriented raising house for meat-type ducks according to Embodiment I.
Figure 2:
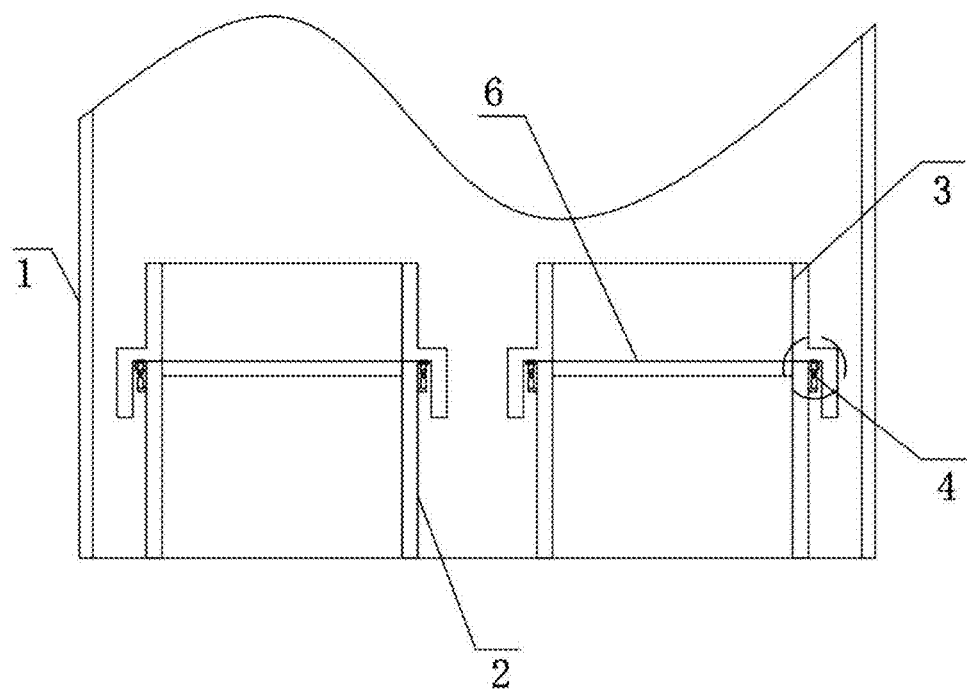
FIG. 2 is a side view of a welfare-oriented raising house for meat-type ducks according to Embodiment I.

As shown in FIGS. 1 to 2, a welfare-oriented raising house for meat-type ducks includes a raising house 1. The raising house 1 is internally provided with a support frame 2 which is of a U-shaped structure and arranged in a length direction of the raising house 1, a raising net 6 arranged at a top of the support frame 2, a cleaning and storing mechanism 5 arranged at one end of the support frame 2 for cleaning and storing the raising net 6, a traction mechanism 7 arranged at the other end of the support frame 2 for the traction of the raising net 6, blocking mechanisms 3 which are of a zigzag structure and arranged at both sides of the support frame 2, and tensioning vibration mechanisms 4 arranged at bottoms of the blocking mechanisms 3 and fixedly connected to a side edge of the support frame 2.

After completely expelling the meat-type ducks that have been bred from the top of the raising net 6, and the raising net 6 is cleaned and stored. At the moment, the blocking mechanism 3 firstly moves upwards without pressing against the raising net 6, and then both the traction mechanism 7 and the cleaning and storing mechanism 5 are started to clean and store the raising net 6 laid flatly on the support frame 2 into the cleaning and storing mechanism 5.

Figure 3:
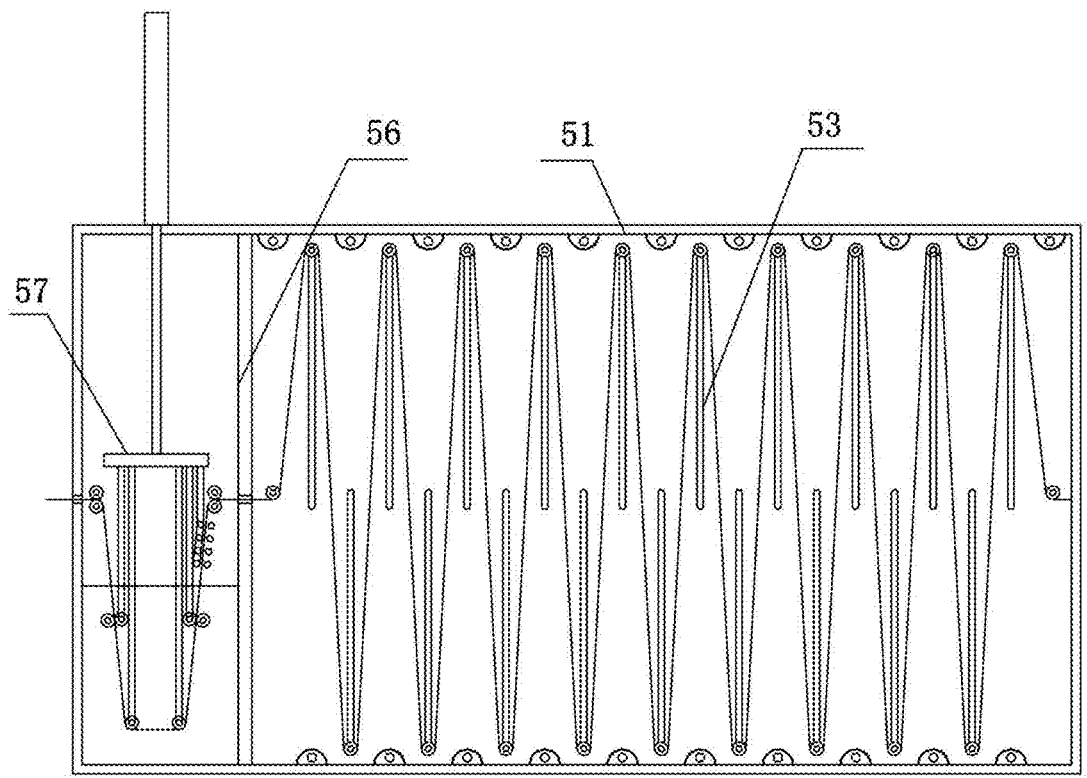
FIG. 3 is a structural schematic diagram of a cleaning and storing mechanism according to Embodiment I.
Figure 4:
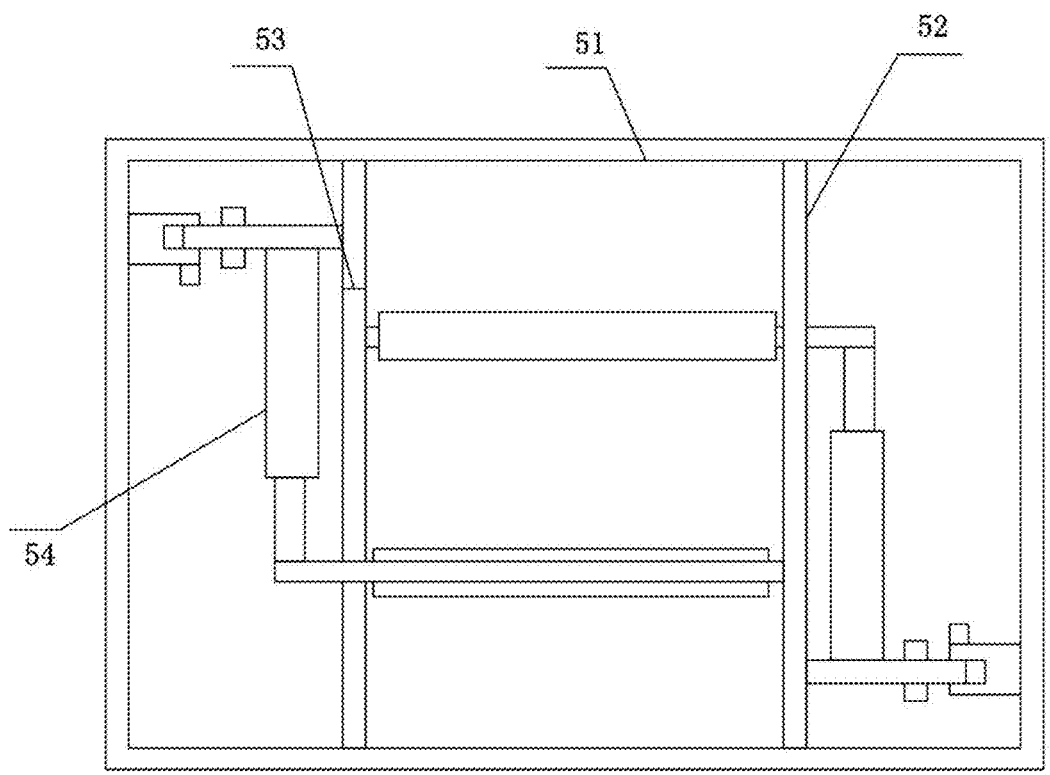
FIG. 4 is a side view of a cleaning and storing mechanism according to Embodiment I.

As shown in FIG. 3 and FIG. 4, the cleaning and storing mechanism 5 includes a box body 51 arranged at an end of the support frame 2, two baffles 52 fixedly connected into the box body 51 and arranged in a length direction of the support frame 2, guide channels 53 penetrating through each of the baffles 52 and equidistantly distributed along a length direction of the baffle 52, tensioning mechanisms 54 on which each guide channel 53 slidingly sleeves and connected to the box body 51, adjusting mechanisms 55 arranged on an inner side wall of the box body 51 and configured for driving the tensioning mechanisms 54 to tension, a partition plate 56 arranged between the two baffles 52, and a cleaning mechanism 57 arranged on one side, close to the support frame 2, of the partition plate 56.

The guide channels 53 of one baffle 52 are located at an upper portion of the one baffle 52, the guide channels 53 of the other baffle 52 are located at a lower portion of the other baffle 52, and guide channel 53 supports on the two baffles 52 are staggered up and down.

Embodiment II

Figure 5:
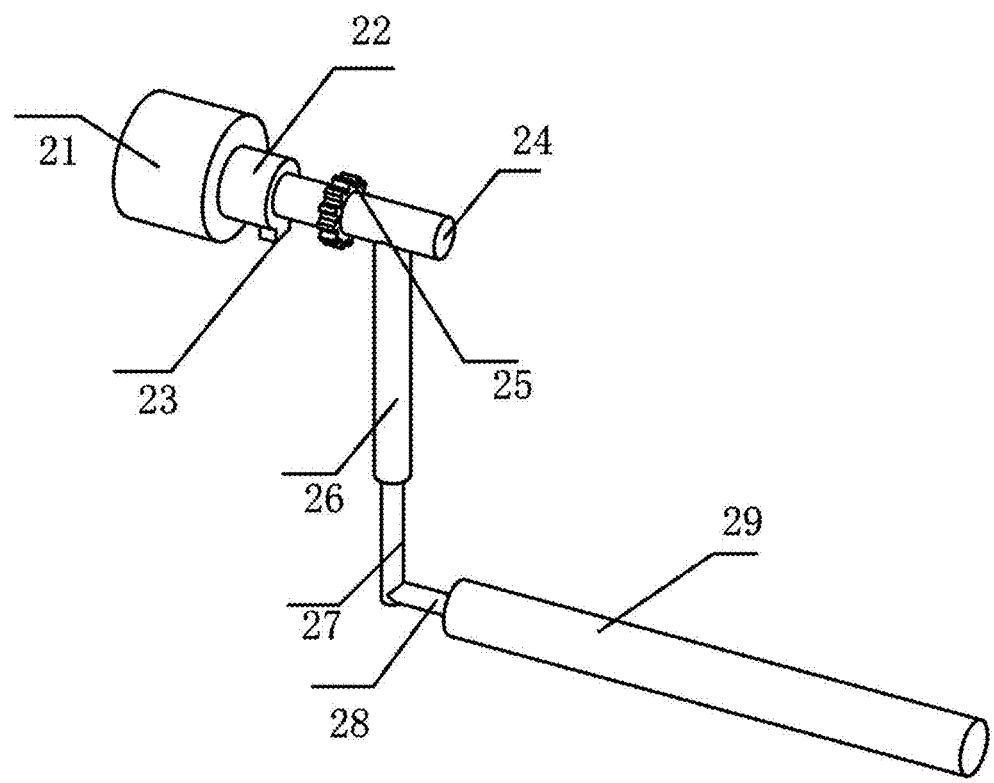
FIG. 5 is a structural schematic diagram of a tensioning mechanism according to Embodiment II.
Figure 6:
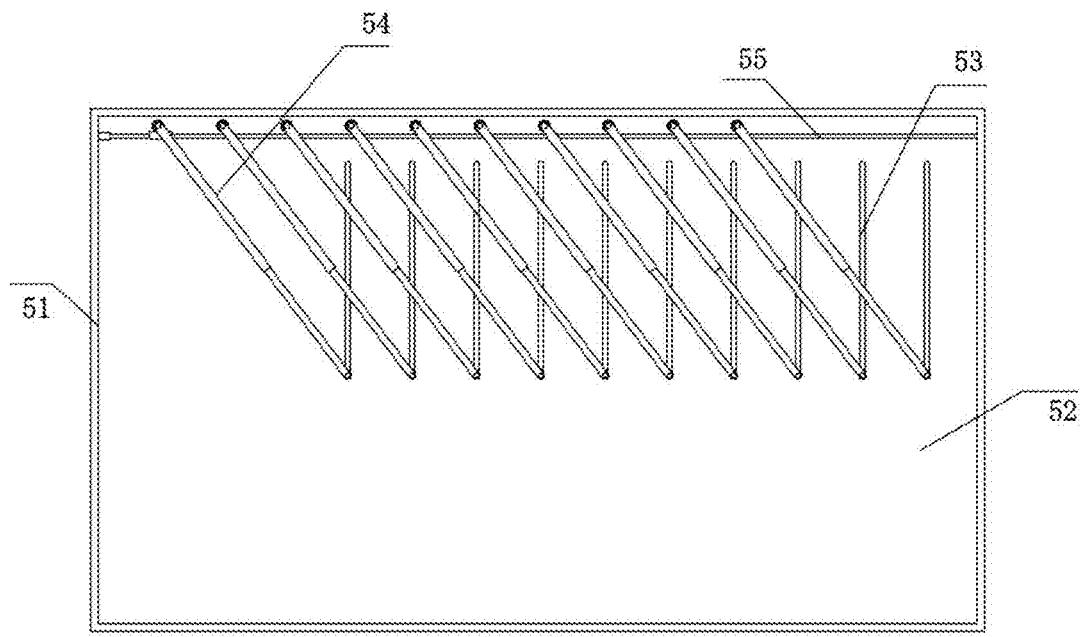
FIG. 6 is a structural schematic diagram of the distribution of tensioning mechanisms according to Embodiment II.

FIG. 5 is a structural schematic diagram of a tensioning mechanism 54 according to this embodiment. Each tensioning mechanism 54 includes a guide pipe 21 fixedly connected to the inner side wall of the box body 51, a movable pipe 22 on which the other end of the guide pipe 21 slidingly sleeves and capable of moving in an axis direction of the guide pipe 21, and a driving shaft 24 on which the other end of the movable pipe 22 slidingly sleeves. The baffle 52 adjacent to the driving shaft movably sleeves on one end, extending out of the movable pipe 22, of the driving shaft 24, and a push plate 23 is fixedly connected to a periphery of the movable pipe 22. A first gear 25 fixedly sleeves on a periphery of the driving shaft 24, a sleeve 26 fixedly connected to the driving shaft 24 is installed at one side, away from the movable pipe 22, of the first gear 25, and the sleeve 26 is perpendicular to the driving shaft 24. One end, away from the driving shaft 24, of the sleeve 26 sleeves outside a telescopic rod 27 moving in a length direction of the sleeve 26, a mounting shaft 28 perpendicular to the telescopic rod 27 is fixedly connected to one end, extending out of the sleeve 26, of the telescopic rod 27, the guide channel 53 slidingly sleeves on the mounting shaft 28, and a tensioning roller 29 movably sleeves on a periphery of the mounting shaft 28.

The cross section of an inner ring of the movable pipe 22 is of a regular polygonal structure. A clamping block with the cross section consistent with that of the inner ring of the movable pipe 22 is fixedly connected to one end, extending into the movable pipe 22, of the driving shaft. A first spring fixedly connected to the inner side wall of the box body 51 is fixedly connected to one end, extending into the guide pipe 22, of the movable pipe 22, and a second spring fixedly connected to the sleeve 26 is fixedly connected to one end, extending into the sleeve 26, of the telescopic rod 27. Sterilizing lamps distributed in a length of the box body 51 are installed in the box body 51, and each sterilizing lamp is located at one side, away from the support frame 2, of the partition plate 56. A heating pipe as well as an air inlet pipe and an exhaust pipe are installed at one side of the sterilizing lamp.

When the driving shaft 24 rotates, the sleeve 26 drives the telescopic rod 27 to rotate to make the mounting shaft 28 move to a position away from the middle of the box body 51 under the guidance of the guide channel 53, thus starting to tighten and store the raising net 6 on the tensioning roller 29.

Embodiment III

Each adjusting mechanism 55 includes a lead screw connected to the baffle 52 through bearing housings, and a slider threadedly sleeving on a periphery of the lead screw. The slider is slidingly connected to the baffle 52; a squeezing plate of a strip structure is fixedly connected to one side, close to a respective tensioning mechanism 54, of a respective slider, and both ends of the squeezing plate are provided with inclined slopes. A rack moved to mesh with the tensioning mechanism 54 is fixed to a top of the squeezing plate. A second motor is installed at the end of the lead screw.

When the second motor on the adjusting mechanism 55 is started, the lead screw rotates, the slider moves towards a rear end from a front end of the box body 51, and the squeezing plate on the slider moves to the position of the first gear 25 on the adjacent tensioning mechanism 54. At this time, the end of the squeezing plate firstly squeezes the push plate 23 to push the movable pipe 22 to the direction of the guide pipe 21, such that the movable pipe 22 is free of clamping with the clamping block on the driving shaft 24, and the driving shaft 24 can rotate. Meanwhile, the end of the rack is in contact and meshed with the first gear 25, and then the first gear 25 rotates under the action of the rack.

Embodiment IV

Figure 8:
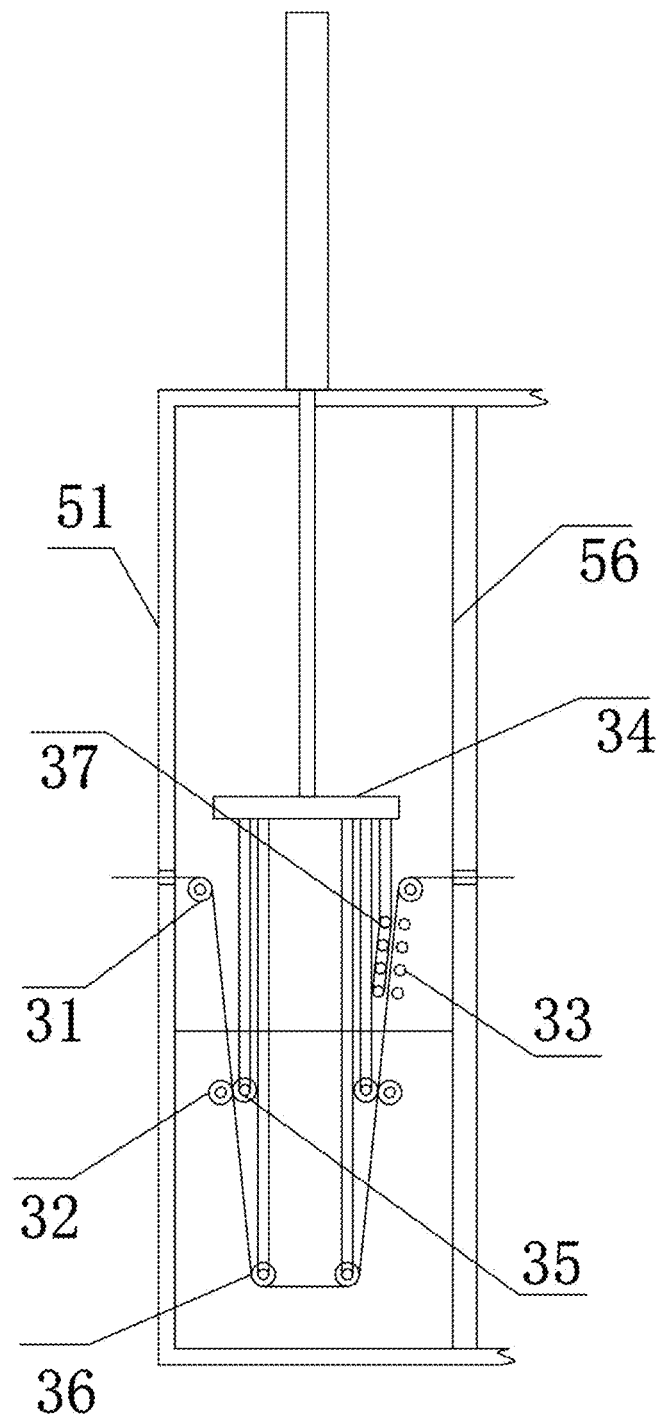
FIG. 8 is a structural schematic diagram of a cleaning mechanism according to Embodiment W.

FIG. 8 is a structural schematic diagram of a cleaning mechanism 57 according to this embodiment. The cleaning mechanism 57 includes two first guide rollers 31 arranged in a direction from the support frame 2 to the partition plate 56 and movably mounted with the box body 51; first cleaning rollers 32 arranged at a bottom between the two first guide rollers 31 and movably mounted with the box body 51; a push plate 34 arranged at a top between the two first guide rollers 31, and two pressing rollers 36 connected to a bottom of the push plate 34 through a support. Second cleaning rollers 35 fixedly connected to the push plate 34 are connected above sides of the two pressing rollers 36 away from each other through the support, first nozzles 33 fixedly connected to the box body 51 are installed between the first guide roller 31 and the first cleaning roller 32 which are close to the partition plate 56, and second nozzles 37 fixedly connected to the push plate 34 are installed at a top of the second cleaning roller 35 adjacent to the partition plate 56 through the support, and a first pushing unit fixedly connected to the box body 51 is installed at the top of the push plate 34.

Inner and outer sides of the raising net 6 are cleaned and blown by the cleaning mechanism 47 in the process of being stored in the box body 51. In the cleaning process, the raising net 6 is pressed by the pressing roller 36 into the water for cleaning injected into the box body 51, and then the first cleaning roller 32 and the second cleaning roller 35 are used to clean from an inner ring side of the raising net 6. Thereafter, the cleaned raising net 6 is jet-dried by the first nozzle 33 and the second nozzle 37.

Embodiment V

The support frame includes two fixing frames arranged inside the raising house 1, and a bottom plate fixedly connected to a top between the two fixing frames, and blanking holes penetrate through the bottom plate.

Embodiment VI

Figure 7:
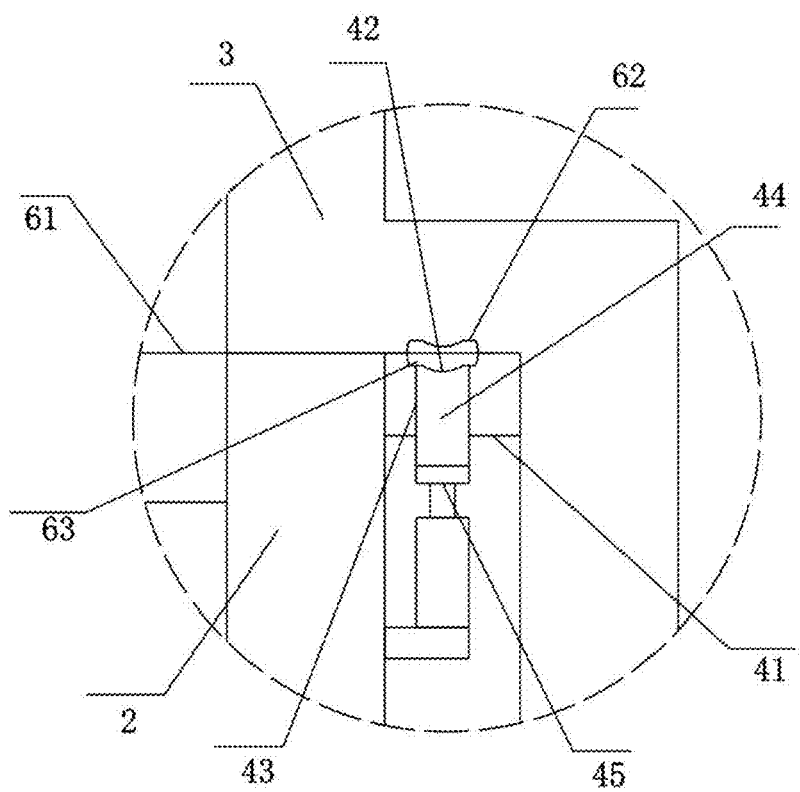
FIG. 7 is a structural schematic diagram of a raising net according to Embodiment VI.

FIG. 7 is a structural schematic diagram of a raising net 6 according to this embodiment. The raising net 6 includes a net-shaped main body 61, and bottom clamping plates 63 arranged on both sides of the main body 61 and arranged in sequence in a length direction of the main body 61. The top clamping plates 62 for clamping the main body 61 are fixed to tops of the bottom clamping plates 63 by screws.

The cross section of ends of the top clamping plate 62 and the bottom clamping plate 63 are both of a quarter circular structure, and after the top clamping plate 62 and the bottom clamping plate 63 are closed, an end is of a semicircular structure.

Embodiment VII

As a further improvement of the above solution, each tensioning vibration mechanism 4 includes guide plates 41 arranged on both sides of the top of the support frame 2, a guide groove 42 provided on a top of each guide plate 41, and inserting holes 43 provided on an inner side wall of a bottom of the guide groove 42 and arranged in sequence in a length direction of the guide plate 41. Each inserting hole 43 slidingly sleeves an ejector rod 44, one end, extending out of the bottom of the inserting hole 43, of each ejector rod 44 is fixedly connected to a same support plate 45, and a second pushing unit fixedly connected to the support frame 2 is installed at a bottom of the support plate 45.

The top of each ejector rod 44 is of a circular structure, and the ejector rods 44 are distributed between adjacent top clamping plates 62.

Embodiment VIII

The blocking mechanism 3 includes a blocking net located at the top of the support frame 2, a pressing plate fixedly connected to the bottom of the blocking net, and a connecting frame fixedly connected to the bottom of the pressing plate. A third pushing unit fixedly connected to the support frame 2 is installed at the bottom of the connecting frame.

Embodiment IX

The traction mechanism 7 includes a transverse plate fixedly connected to the end of the support frame 2, and a winding reel fixedly connected to the transverse plate and provided with an opening at a top. The winding reel movably sleeves a winding shaft, a pull rope fixedly connected to an end of the raising net 6 is fixedly connected to a periphery of the winding shaft, and a first motor fixedly connected to the winding reel is installed at one end of the winding shaft. The first pushing unit, the second pushing unit and the third pushing unit each employ a linear actuator.

In the raising and cleaning process, after completely expelling the meat-type ducks that have been bred from the top of the raising net 6, and the raising net 6 is cleaned and stored. At the moment, the blocking mechanism 3 firstly moves upwards without pressing against the raising net 6, and then both the traction mechanism 7 and the cleaning and storing mechanism 5 are started to clean and store the raising net 6 laid flatly on the support frame 2 into the cleaning and storing mechanism 5.

In the process of storing the raising net 6 into the box body 51, the raising net 6 is always in a tightened state under the action of the traction mechanism 7. When moving, the end of the bottom clamping plate 63 intermittently collides with the ejector rod 44, making the raising net 6 shake as a whole during the movement. At this time, foreign matters left on the raising net 6 is shaken off to preliminarily clean the raising net 6. Meanwhile, when laying the raising net 6, the ejector rod 44 is located between the adjacent bottom clamping plates 63, and under the pressure of the blocking mechanism 3, the raising net 6 is in a tightened state, and the laid raising net 6 is prevented from infirmly fixing and loosely tensioning.

Inner and outer sides of the raising net 6 are cleaned and blown by the cleaning mechanism 47 in the process of storing the raising net 6 into the box body 51. In the cleaning process, the raising net 6 is pressed by the pressing roller 36 into the water for cleaning injected into the box body 51, and then the first cleaning roller 32 and the second cleaning roller 35 are used to clean from an inner ring side of the raising net 6. Thereafter, the cleaned raising net 6 is jet-dried by the first nozzle 33 and the second nozzle 37.

In the process of winding the cleaned raising net 6, firstly, the second motor on the adjusting mechanism 55 is started, and the lead screw rotates. At this time, the slider moves to the rear end from the front end of the box body 51, and the squeezing plate on the slider moves to the position of the first gear 25 on the adjacent tensioning mechanism 54. At this time, the end of the squeezing plate first squeezes the push plate 23 to push the movable pipe 22 towards the guide pipe 21, such that the movable pipe 22 is free of clamping with the clamping block on the driving shaft 24, and the driving shaft 24 can rotate. Meanwhile, the end of the rack is in contact and meshed with the first gear 25, the first gear 25 rotates under the action of the rack, and then the driving shaft 24 rotates. When the driving shaft 24 rotates, the sleeve 26 drives the telescopic rod 27 to rotate to make the mounting shaft 28 move towards a position far away from the middle of the box body 51 under the guidance of the guide channel 53, thus starting to tighten and store the raising net 6 on the tensioning roller 29. Thereafter, tensioning mechanisms 54 arranged on the two baffles 52 are alternately tensioned in turn to distribute the raising net 6 in a zigzag structure, thus storing the raising net 6 in the box body 51. Then, the raising net 6 is dried using the heating pipe and sterilized using the sterilizing lamp.

According to such a design, the raising net is tensioned by traction in the process of laying the raising net, and then the raising net is laid flatly on the support frame in a sectional positioning and pressing manner, thus preventing the raising net from being laid infirmly and loosely in the raising process. In the process of cleaning and storing the raising net, firstly, the raising net is shaken during the movement of the raising net, and most foreign matters adhered to the raising net are separated, which is convenient for the subsequent cleaning operation. In the process of cleaning and storing, the raising net is firstly pressed for cleaning and then dried, and then the raising net is stored in an alternate tightening and storing manner. The stored raising net is sterilized and dried to effectively remove the foreign matters left on the raising net. The raising net is sterilized, thus preventing the bacteria left on the raising net from infecting the meta ducks. The raising ring in the raising house is improved, and the meat-type duck raising is facilitated.

The above embodiments are only preferred embodiments of the present disclosure and therefore cannot be used to limit the scope of protection of the present disclosure. Any non-substantial changes and substitutions made by those skilled in the art on the basis of the present disclosure are within the scope of protection claimed by the present disclosure.

What is claimed is:

1. A welfare-oriented raising house for meat-type ducks, comprising a raising house, wherein the raising house is internally provided with a support frame which is of a U-shaped structure and arranged in a length direction of the raising house, a raising net arranged at a top of the support frame, a cleaning and storing mechanism arranged at one end of the support frame for cleaning and storing the raising net, a traction mechanism arranged at an other end of the support frame for a traction of the raising net, blocking mechanisms which are of a zigzag structure and arranged at both sides of the support frame, and tensioning vibration mechanisms arranged at bottoms of the blocking mechanisms and fixedly connected to a side edge of the support frame;
the cleaning and storing mechanism comprises a box body arranged at an end of the support frame, two baffles fixedly connected into the box body and arranged in a length direction of the support frame, guide channels penetrating through each of the two baffles and equidistantly distributed along a length direction of the baffles, tensioning mechanisms on which each of the guide channels slidingly sleeves and connected to the box body, adjusting mechanisms arranged on an inner side wall of the box body and configured for driving the tensioning mechanisms to tension, a partition plate arranged between the two baffles, and a cleaning mechanism arranged on one side, close to the support frame, of the partition plate.

2. The welfare-oriented raising house for meat-type ducks according to claim 1, wherein the tensioning mechanisms each comprise a guide pipe fixedly connected to the inner side wall of the box body, a movable pipe on which an other end of the guide pipe slidingly sleeves and capable of moving in an axis direction of the guide pipe, and a driving shaft on which an other end of the movable pipe slidingly sleeves; a baffle of the two baffles adjacent to the driving shaft movably sleeves on one end, extending out of the movable pipe, of the driving shaft, and a push plate is fixedly connected to a periphery of the movable pipe; a first gear fixedly sleeves on a periphery of the driving shaft, a sleeve fixedly connected to the driving shaft is installed at one side, away from the movable pipe, of the first gear, and the sleeve is perpendicular to the driving shaft; one end, away from the driving shaft, of the sleeve sleeves outside a telescopic rod moving in a length direction of the sleeve, a mounting shaft perpendicular to the telescopic rod is fixedly connected to one end, extending out of the sleeve, of the telescopic rod, the guide channel slidingly sleeves on the mounting shaft, and a tensioning roller movably sleeves on a periphery of the mounting shaft.

3. The welfare-oriented raising house for meat-type ducks according to claim 1, wherein the adjusting mechanisms each comprise a lead screw connected to the two baffles through bearing housings, and a slider threadedly sleeving on a periphery of the lead screw; the slider is slidingly connected to the baffles; a squeezing plate of a strip structure is fixedly connected to one side, close to respective one of the tensioning mechanisms, of the slider, and both ends of the squeezing plate are formed with inclined slopes; and a rack moved to mesh with the respective tensioning mechanism is fixed to a top of the squeezing plate.

4. The welfare-oriented raising house for meat-type ducks according to claim 1, wherein the cleaning mechanism comprises two first guide rollers arranged in a direction from the support frame to the partition plate and movably mounted with the box body; first cleaning rollers arranged at a bottom between the two first guide rollers and movably mounted with the box body; a push plate arranged at a top between the two first guide rollers; two pressing rollers connected to a bottom of the push plate through a support; second cleaning rollers fixedly connected to the push plate and connected above sides of the two pressing rollers through the support; first nozzles fixedly connected to the box body and installed between a first guide roller and a first cleaning roller which are close to the partition plate; and second nozzles fixedly connected to the push plate and installed at a top of a second cleaning roller adjacent to the partition plate through the support; and a first pushing unit fixedly connected to the box body and installed at the top of the push plate.

5. The welfare-oriented raising house for meat-type ducks according to claim 1, wherein the guide channels of one of the two baffles are located at an upper portion of the one baffle, the guide channels of other one of the two baffles are located at a lower portion of the other baffle, and guide channel supports on the two baffles are staggered up and down.

6. The welfare-oriented raising house for meat-type ducks according to claim 1, wherein the support frame comprises two fixing frames arranged inside the raising house, and a bottom plate fixedly connected to a top between the two fixing frames, wherein blanking holes penetrate through the bottom plate.

7. The welfare-oriented raising house for meat-type ducks according to claim 1, wherein the raising net comprises a net-shaped main body, bottom clamping plates arranged on both sides of the main body and arranged in sequence in a length direction of the main body, and top clamping plates for clamping the main body fixed to tops of the bottom clamping plates by screws.

8. The welfare-oriented raising house for meat-type ducks according to claim 1, wherein the tensioning vibration mechanisms each comprise guide plates arranged on both sides of the top of the support frame, a guide groove formed on a top of each one of the guide plates, and inserting holes provided on an inner side wall of a bottom of the guide groove and arranged in sequence in a length direction of the guide plate; each one of the inserting hole slidingly sleeves an ejector rod, one end, extending out of the bottom of the inserting hole, of the ejector rod is fixedly connected to a same support plate, and a second pushing unit fixedly connected to the support frame is installed at a bottom of the support plate.

9. The welfare-oriented raising house for meat-type ducks according to claim 1, wherein the blocking mechanisms each comprise a blocking net located at the top of the support frame, a pressing plate fixed to a bottom of the blocking net, and a connecting frame fixed to a bottom of the pressing plate; and a third pushing unit fixedly connected to the support frame is installed at a bottom of the connecting frame.

10. The welfare-oriented raising house for meat-type ducks according to claim 1, wherein the traction mechanism comprises a transverse plate fixedly connected to the other end of the support frame, and a winding reel fixedly connected to the transverse plate and provided with an opening at a top; the winding reel movably sleeves a winding shaft, a pull rope fixedly connected to an end of the raising net is fixedly connected to a periphery of the winding shaft, and a first motor fixedly connected to the winding reel is installed at one end of the winding shaft.

* * * * *